May 26, 1959  M. M. BUDD  2,887,983
EMERGENCY ROAD FLAG
Filed Nov. 22, 1957  2 Sheets-Sheet 2

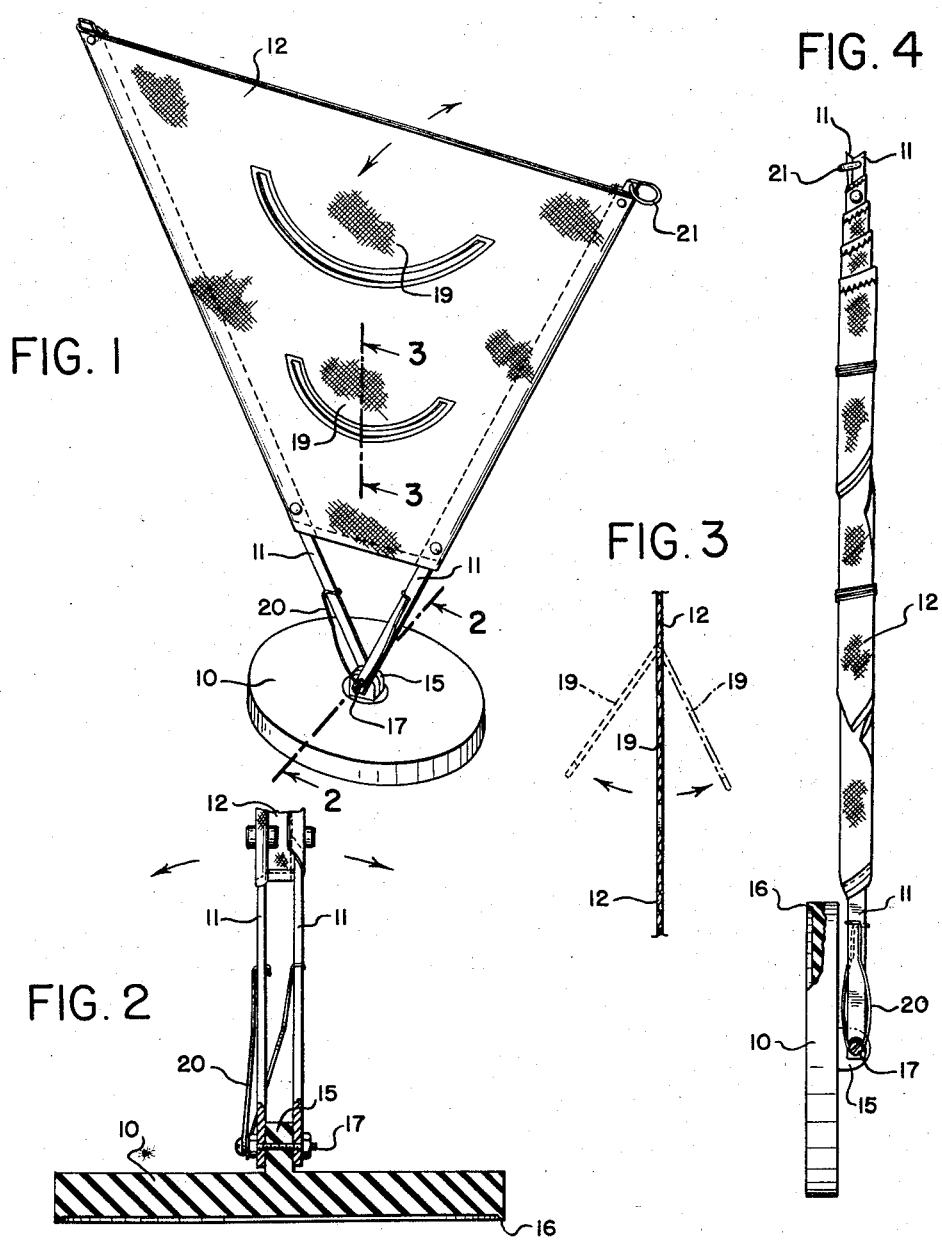

INVENTOR.
Marshall Budd
BY Pennie, Edmonds, Morton, Barrows, Taylor
ATTORNEYS

United States Patent Office 2,887,983
Patented May 26, 1959

2,887,983

EMERGENCY ROAD FLAG

Marshall M. Budd, Jackson Heights, N.Y.

Application November 22, 1957, Serial No. 698,152

8 Claims. (Cl. 116—63)

This invention relates to portable emergency road flags. In particular it relates to an emergency road flag that will remain erect and effective as a warning signal in spite of the windage created by passing vehicles, and that will remain visible under conditions of poor illumination due to the fluorescent properties of the fabric from which the flag is made.

When an automobile or other vehicle makes an emergency stop on a highway it is desirable, and it is frequently required by law, to place an emergency warning signal, such as a flag or light, on the highway to warn oncoming vehicles of the presence of the disabled vehicle. Many portable emergency warning devices have been developed heretofore, and these devices include electric lamps, pyrotechnic devices such as flares, and simple visual warning devices such as reflectors and flags. Electrics and pyrotechnic devices are effective, but they are relatively expensive compared to a simple visual signal such as a flag or the like and they deteriorate through age or are consumed through use. On the other hand, a simple flag consisting of a square piece of red fabric attached to a flag staff and mounted in a base member of some sort is neither adequate nor reliable as an emergency warning device. Such flags are difficult to see even when there is good visibility and a wind blowing that will ruffle the flag and thus cause it to direct attention to itself, and are almost impossible to see unless a wind is blowing or under conditions of poor illumination. Much effort has been devoted to the problem of improving the visibility and effectiveness of visual signal flags of this type, and a familiar expedient to this end is to provide a rigid frame for the flag which will maintain the flag in an extended position so that the maximum area of the flag is presented to oncoming vehicles. However, when a signal flag is maintained in an extended position in this fashion it is extremely vulnerable to being tipped over by a sudden gust of wind, and in particular by the windage created by passing vehicles. The windage created by a rapidly moving vehicle is surprisingly violent and unless an exceptionally heavy and cumbersome base structure is provided for the extended signal flag and its supporting frame, the flag will inevitably soon be overturned and rendered wholly ineffective. Moreover, even though the flag and the supporting frame are mounted on an impractically heavy base member, the flag is next to impossible to see at night and under conditions of poor visibility.

Due to the aforementioned shortcomings of the previously known emergency road flags, these important safety devices have not met with wide acceptance by the general public, and when they have been used they have proved to be inefficient and frequently unreliable. I have now developed an improved emergency road flag that is maintained in its extended position for maximum visibility at all times, that is very light in weight, that is nonetheless exceedingly stable and is virtually impossible to overturn as a result of the windage created by passing vehicles, and that is visible under conditions of poor illumination due to the fluorescent properties of the fabric from which the flag is made. My new emergency road flag comprises a base member preferably formed of molded rubber, a pair of flexible arms extending divergently upwardly from the base member, the bottom ends of the flexible support arms being secured to the base member adjacent each other, and a flag panel secured to the upper ends of the flexible arms, the flag panel being made of a fluorescent fabric and being formed with at least one vent flap disposed between the flexible support arms.

My invention will be better understood from the following description thereof in conjunction with the accompanying drawings of which Fig. 1 is a perspective view of a preferred embodiment of my emergency road flag;

Fig. 2 is a section along line 2—2 of Fig. 1 showing the means by which the flexible arms are secured to the base member;

Fig. 3 is a section along line 3—3 of Fig. 1;

Fig. 4 is a front elevation of the signal flag of Fig. 1 showing it folded for stowage;

Figure 5:
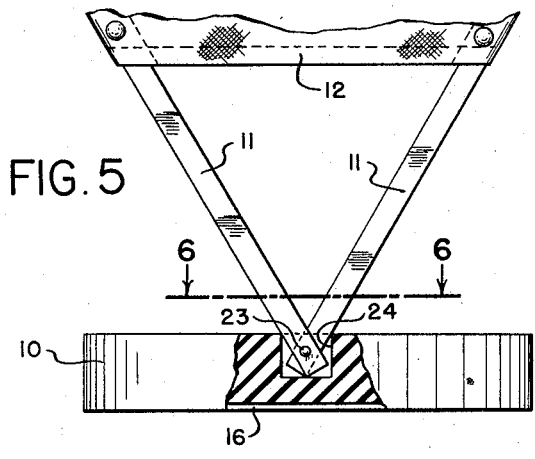
Fig. 5 is a fragmentary front elevation of an advantageous modification of my emergency road flag with a portion of the base broken away to show how the flexible arms are secured thereto.

The major components of the emergency road flag of my invention comprise a base member 10, a pair of flexible support arms 11 mounted on the base member, and a fabric flag 12 mounted on the support arms. The base member 10 is made of a relatively light weight material such as molded rubber or a resilient plastic, and advantageously is in the form of a cylinder or disk of the material having, in a typical case, a diameter of about 8 inches and a height of about one inch. In the modification of my invention shown in Figs. 1 through 4, the upper surface of the base member 10 is formed with an upwardly projecting boss portion 15 on which the flexible arms are mounted, and the bottom of the base member is advantageously provided with a small downwardly extending rim portion 16 which helps to provide a firm footing for the base member 10 on uneven ground.

The lower ends of the flexible support arms 11 are secured to the upper surface of the base member 10 adjacent each other and adjacent the center of the base member. In the embodiment of my invention shown in Figs. 1 through 4, the lower ends of the support arms 11 are secured to the boss portion 15 of the base member by means of a bolt or some equivalent fastening device 17. When in their erect position the support arms 11 extend upwardly from the base member 10 and divergently outwardly from each other. Moreover, the support arms 11 must be stiff enough so that they normally stand erect and support the weight of the flag panel 12, and their flexibility or springiness must be so correlated to the base area of the base member and its weight that they will bend readily when the flag panel 12 is subjected to a gust of wind and thus allow the flag panel to spill the wind therefrom. The support arms 11 are advantageously formed from thin strips of spring steel, stiff piano wire, coil springs, stiff springy plastic sheet material, and the like. From the foregoing it will be seen that the flexible support arms 11 between them form a flexible V-shaped supporting structure adapted to support the fabric flag panel 12 and to bend or dip when the flag panel 12 is subjected to a gust of wind or to the windage of a passing vehicle.

The flag panel 12 is attached to the support arms 11 advantageously by wrapping the fabric of the flag about each support arm and sewing or otherwise securing the fabric in place thereabout as shown in Fig. 1. The flag panel 12 is advantageously made from a woven nylon fabric, from polyvinylchloride film or some similar thermoplastic material, or from an appropriately impregnated paper. As a consequence, the flag panel 12 can be attached to the flexible supporting arms 11 merely by running a hot iron down the seam to be fastened, or by securing the seam with pressure sensitive plastic tape, instead of sewing the seam in conventional manner. The fabric of the flag panel 12, or the fibers from which the fabric of the panel is woven, are treated either before or after weaving so as to impart fluorescent properties to the fabric. As a consequence, the flag panel 12 is made of a fluorescent fabric that is bright and visible both in the daytime and under conditions of poor illumination such as at dusk or at night. That is to say, even under conditions of such poor illumination that ordinary emergency flags would be impossible to see, if only a small amount of light falls on the flag panel 12, the fabric will fluoresce and the flag will be visible to oncoming motorists. The flag panel 12 is formed with at least one, and preferably is formed with two or more, vent flaps 19 which are disposed between the support arms 11. The vent flaps 19, which advantageously are semi-circular in shape and are cut and hemmed or edge sealed by heat, provide one or more openings in the panel 12 through which the wind blowing against the flag panel is allowed to pass. That is to say, the vent flaps 19 formed in the flag panel 12 are free to be blown open as shown in Fig. 3, so as to provide an opening in the flag panel which will allow wind blowing against the panel to pass through the panel and thus reduce the pressure of the wind on the panel.

A spring means 20 shown best in Figs. 1 and 2 is advantageously provided which tends to spread the supporting arms 11 apart and thus maintain the flag panel 12 in its extended position. The spring means 20 is designed to avoid skew of the panel and is mounted on the bolt 17 as shown best in Fig. 2. The flag can be folded up for stowage in the trunk of a car or other vehicle simply by moving the two supporting arms 11 together and securing them in this position by means of the lock ring 21, by wrapping the fabric of the flag panel 12 around the supporting arms 11, and by folding the supporting arms 11 flat against the base member 10 as shown in Fig. 4.

As noted, it is essential that the supporting arms 11 be flexible spring-like members, particularly where they approach the base member 10, so that when a strong gust of wind blows against the flag panel 12 the force of the wind on the flag panel will cause the arms 11 to bend and the flag panel to dip down and spill the wind without upsetting the entire emergency flag. Accordingly, from the foregoing description of my new emergency road flag it will be seen that the combination of the flexible supporting arms 11, the wide disk-like base member 10, the V-shape of the flag panel 12, and the vent flaps 19 formed in the flag panel cooperate to prevent the device of my invention from being blown over by the windage of passing vehicles.

Figure 6:
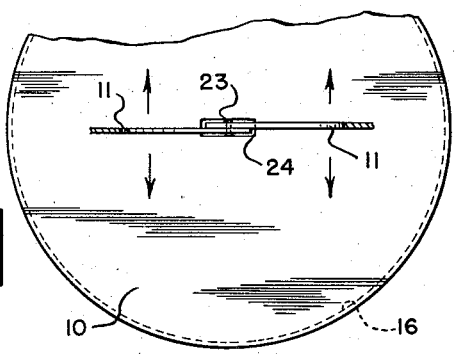
Fig. 6 is a section along line 6—6 of Fig. 5.

In the modification of my invention shown in Figs. 5 and 6, the flexible supporting arms 11 are pivotally pinned together at their lower ends by the rivet or pin 23, and the disk-shaped base member 10 is formed with a slot 24 adapted to receive the lower ends of the supporting arms 11, as shown in Figs. 5 and 6 of the drawing. The width of the slot 24 is advantageously slightly less than the maximum width or thickness of the two supporting arms 11 so that when the lower ends of the supporting arms are forced into the slot they will be held firmly therein by frictional engagement with the sides of the slot 24. This firm frictional grip of the rubber-like material of the base member 10 also tends to maintain the flexible support arms 11 at their aforementioned V-shaped outwardly divergent position so that the flag panel 12 secured thereto will be maintained at its extended position of maximum visibility.

The emergency road flag shown in Figs. 5 and 6 of the drawing, possesses all of the essential characteristics of the previously described embodiment of my invention and, in addition, possesses the further advantages of being readily assembled for use and disassembled for stowage, and of being less expensive and simpler to manufacture than the first described embodiment thereof.

Figure 7:
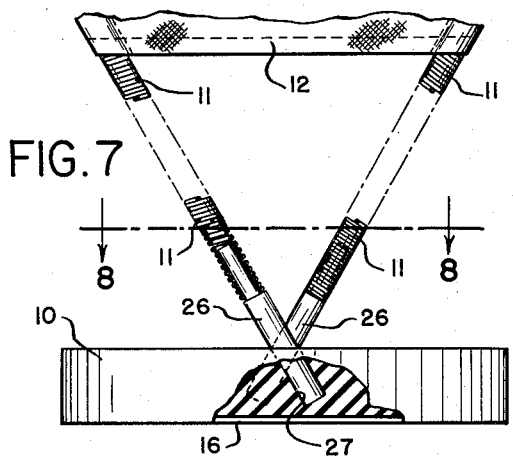
Fig. 7 is a fragmentary front elevation of another modification of my invention with a portion of the base member broken away to show the means for mounting the flexible arms thereon.
Figure 8:
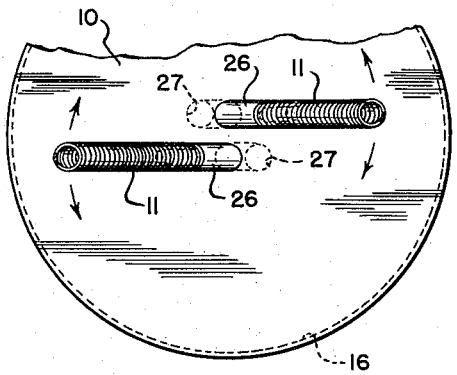
Fig. 8 is a section taken along line 8—8 of Fig. 7.

In the embodiment of my invention as shown in Figs. 7 and 8 of the drawing the flexible support arms 11 are formed from coil springs. The lower ends of the coil springs 11 are advantageously mounted on foot members 26 which, in turn, are inserted in holes 27 formed in the base member 10 of the device. In addition to the exceptional flexibility of the coil spring support arms 11, this modification of my invention possesses the further advantage that, although the lower ends of the flexible arms 11 are disposed adjacent each other in the base member 10, they are not pinned together, thus further simplifying the assembly, disassembly and stowage of the device. That is to say, the device is disassembled for stowage simply by removing the foot portions 26 of the support arms 11 from the holes 27 in the base member 10, and then laying flexible arms side by side with the flag panel 12 wrapped thereabout.

Figure 9:
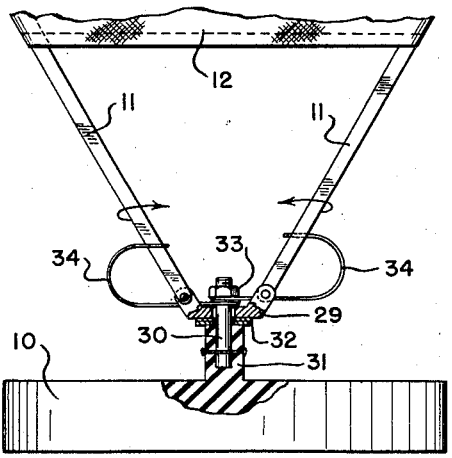
Fig. 9 is a fragmentary front elevation of still another modification of my emergency signal flag designed to permit the flag to rotate as well as to bend back and forth under the pressure of the wind.

In the embodiment of my invention shown in Fig. 9, the flexible support arms 11 are mounted on a rotatable member 29 which, in turn, is rotatably mounted on a stud 30 embedded in a boss 31 formed on the base member 10. The rotatable member 29 is separated from the boss 31 by means of washers 32 and is held in place on the stud 30 by means of the nut 33. Alternatively, the boss 31 can be dispensed with and the stud 30 can be embedded directly in the base member 10 with the washer 32 separating the rotor member 29 from the upper surface of the base member. Spring means 34 also mounted on the stud 30 are advantageously provided to maintain the flexible support arms 11 in their outwardly extended position and thereby maintain the flag panel 12 in its extended position of maximum visibility. Accordingly, from the foregoing it will be seen that the emergency road flag shown in Fig. 9 not only possesses the essential characteristics of my invention as previously described, but in addition possesses the further advantage that the flag panel can rotate around the vertical axis of the device (i.e., the stud 30) under the pressure of the wind due to the fact that the flexible support arms 11 are mounted on the rotatable member 29.

From the foregoing description of my invention, it will be appreciated that I have devised a simple yet efficient and reliable emergency road flag that constitutes an important advance over the relatively inefficient and unreliable prior art devices.

I claim:

1. An emergency road flag which comprises a base member, a pair of outwardly diverging and upwardly extending flexible support arms the lower ends of which support arms are pivotally secured to a rotatable member, said rotatable member being rotatably mounted on the upper surface of said base member adjacent the center thereof, spring means urging said flexible support arms divergently apart, and a flexible flag panel secured to the two flexible support arms.

2. An emergency warning flag adapted to be set on a highway which comprises a base member, a pair of upwardly-extending and outwardly-diverging flexible support arms, the bottom ends of the flexible support arms being secured to the base adjacent each other and adjacent the center of the base member, and a flexible flag panel of generally truncated V-shape secured along its edges to the flexible support arms, the flexibility of the support arms being so correlated to the base area and weight of the base member that, under the force of winds encountered on highways, they will bend and dip down and spill the wind without upsetting the entire flag device.

3. An emergency warning flag as set forth in claim 2 which further includes spring-biased means engaging the support arms and urging them to their outwardly-divergent position.

4. An emergency warning flag as set forth in claim 2 in which the base has a slot in the upper sides thereof, the lower ends of the flexible support arms are pivotally connected to one another and the lower ends of the support arms are in said slot and frictionally retained therein by engagement with walls defining said slot.

5. An emergency warning flag as set forth in claim 2 in which the flexible support arms are coiled springs.

6. An emergency warning flag adapted to be set on a highway which comprises a disc-shaped base member of a resilient rubber-like material, said base member having a centrally-disposed, upwardly-extending boss, a pair of flexible support arms extending divergently upwardly from the base member, the lower ends of said flexible support arms being pivotally secured to said boss, a spring-biased member having its free ends engaging the respective support arms and urging them outwardly to their divergent position, a flexible flag panel of generally truncated V-shape secured along its edges to the flexible support arms, the flexibility of the support arms being so correlated to the base area and weight of the base member that, under the force of winds encountered on highways, they will bend and dip down and spill the wind without upsetting the entire flag device.

7. An emergency warning flag as set forth in claim 6 in which the flag panel has at least one vent flap in the portion thereof between the support arms.

8. An emergency warning flag as set forth in claim 6 in which the flag panel is a fluorescent fabric.

References Cited in the file of this patent

UNITED STATES PATENTS

| | | |
|---|---|---|
| 447,696 | Mundhenk | Mar. 3, 1891 |
| 523,293 | Smith | July 17, 1894 |
| 1,846,988 | Buck | Feb. 23, 1932 |
| 2,447,075 | Madsen | Aug. 17, 1948 |
| 2,655,126 | Francis | Oct. 13, 1953 |
| 2,681,030 | Hoge | June 15, 1954 |

FOREIGN PATENTS

| | | |
|---|---|---|
| 15,020 | Great Britain | 1902 |